US012617953B2

(12) United States Patent  (10) Patent No.: US 12,617,953 B2
Teague et al.  (45) Date of Patent: *May 5, 2026

(54) PAINT REMOVER HAVING REDUCED FLAMMABILITY

(71) Applicant: W.M. Barr & Company, Inc., Memphis, TN (US)

(72) Inventors: Tim Teague, Nesbit, MS (US); Matthew Michael Petkus, Memphis, TN (US); Dennis Earl Shireman, Marion, AR (US); Alana Byrd, Memphis, TN (US)

(73) Assignee: W.M. BARR & COMPANY, INC., Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,039

(22) Filed: Apr. 28, 2022

(65) Prior Publication Data

US 2022/0251405 A1     Aug. 11, 2022

Related U.S. Application Data

(63) Continuation of application No. 16/394,457, filed on Apr. 25, 2019, now Pat. No. 12,509,597.

(60) Provisional application No. 62/663,414, filed on Apr. 27, 2018.

(51) Int. Cl.
   *C09D 9/04*        (2006.01)
   *C09D 9/00*        (2006.01)

(52) U.S. Cl.
   CPC .............. *C09D 9/005* (2013.01); *C09D 9/04* (2013.01)

(58) Field of Classification Search
   CPC .................................. C09D 9/005; C09D 9/04
   See application file for complete search history.

(56) References Cited

U.S. PATENT DOCUMENTS

| | | | |
|---|---|---|---|
| 5,780,409 A | 7/1998 | Distaso | |
| 6,159,915 A | 12/2000 | Machac, Jr. et al. | |
| 6,200,940 B1 | 3/2001 | Vitomir | |
| 6,395,103 B1 | 5/2002 | Machac, Jr. et al. | |
| 6,673,157 B1 * | 1/2004 | McKim | C09D 9/005 |
| | | | 134/2 |
| 6,833,345 B2 | 12/2004 | Machac, Jr. et al. | |
| 7,449,437 B2 | 11/2008 | Gross et al. | |
| 8,828,917 B2 * | 9/2014 | Rieth | C11D 7/267 |
| | | | 510/401 |
| 9,156,809 B2 | 10/2015 | Rieth et al. | |
| 9,455,447 B2 | 9/2016 | Thillaiyan et al. | |
| 9,458,414 B2 | 10/2016 | Rieth et al. | |
| 9,868,867 B1 | 1/2018 | Manley | |
| 10,717,885 B2 | 7/2020 | Morose | |
| 2004/0058833 A1 | 3/2004 | Gross et al. | |
| 2006/0089281 A1 | 4/2006 | Gibson | |
| 2007/0101902 A1 | 5/2007 | Frees et al. | |
| 2008/0139437 A1 | 6/2008 | Power | |
| 2010/0273696 A1 | 10/2010 | Hopfstock | |
| 2017/0042784 A1 | 2/2017 | Munk et al. | |

FOREIGN PATENT DOCUMENTS

| | | | | |
|---|---|---|---|---|
| CA | 3092103 A1 | 9/2019 | | |
| CH | 670832 A5 | 7/1989 | | |
| DE | 1621597 A1 * | 3/1971 | | |
| DE | 195263351 B4 | 6/2005 | | |
| WO | 03062325 A2 | 7/2003 | | |
| WO | WO-2018039415 A1 * | 3/2018 | ............. | C09D 9/005 |
| WO | 2019168919 A1 | 9/2019 | | |

OTHER PUBLICATIONS https://patents.google.com/patent/DE1621597A1/en (Year: 1971).*
Chinese Official Action (CNOA) for CN Appl. No. 201980042536. 5; Issued Dec. 9, 2022 (12 Pages).
International Search Report and Written Opinion (ISR) issued for International Application No. PCT/US2019/029368 dated Jun. 20, 2019 (10 pages).
Non-Final Office Action (NFOA) issued for U.S. Appl. No. 16/394,457, dated Nov. 27, 2020 (11 pages).
International Preliminary Report on Patentability issued for International Application No. PCT/US2019/029368 dated Oct. 27, 2020 (8 pages).
Final Rejection (FR) issued for U.S. Appl. No. 16/394,457, dated Aug. 30, 2021 (11 pages).
Supplementary European Search Report (ESR) issued for European Pat. Appln. No. EP19793097 dated Feb. 22, 2022 (2 pages).
Non-Final Office Action (NFOA) issued for U.S. Appl. No. 16/394,457, dated Apr. 13, 2022 (11 pages).
Octadecenoate—Wiktionary (Year: 2022).
Final Rejection (FR) issued for U.S. Appl. No. 16/3934,457, dated Dec. 9, 2022 (10 pages).
Official Search Report issued Oct. 4, 2023 for Brazilian Patent Application No. BR112020022026-4 (4 Pages).
Canadian Office Action issued in corresponding Canadian Application No. 3,098,556; issued Mar. 4, 2024; (8 pages).

* cited by examiner

*Primary Examiner* — Angela C Brown-Pettigrew
*Assistant Examiner* — Preeti Kumar
(74) *Attorney, Agent, or Firm* — Shumaker, Loop & Kendrick, LLP

(57)        ABSTRACT

A composition comprises dimethyl carbonate (DMC) and dimethyl sulfoxide (DMSO) and has a flash point of 70° F. or greater. The composition has a total VOC content defined by the Environmental Protection Agency (EPA) of 50 weight percent (%) or less. The composition removes or strips paint in a period of time of two hours or less. The composition may further comprises one or more corrosion inhibitors.

15 Claims, No Drawings

PAINT REMOVER HAVING REDUCED FLAMMABILITY

CROSS-REFERENCE TO RELATED APPLICATIONS

This application is a Continuation application which claims priority from U.S. patent application Ser. No. 16/394, 457, filed Apr. 25, 2019, pending, which claims priority from U.S. Provisional Patent application No. 62/663,414, filed on Apr. 27, 2018, in the United States Patent and Trademark Office. The disclosures of which are incorporated herein by reference in their entireties.

FIELD OF THE INVENTION

The present invention relates to the field of paint removers or paint strippers.

BACKGROUND OF THE INVENTION

Most consumers use paint removers, also commonly referred to as paint strippers, for refinishing antique furniture, or woodworking's (doors, frames, moldings, etc.) in older houses. Many of these items have been painted and repainted many times over the years. This results in items having multiple layers of paint containing different chemistry types and a different degree of difficulty from being removed. Paint removers are also used in the auto body repair industry to help with vehicle restoration.

Currently methylene chloride and N-Methylpyrrolidone (NMP) are used in the majority of paint removers in the United States. Methylene chloride has been the preferred solvent for use in paint removers for seventy years. Before methylene chloride was introduced, most paint removers consisted of a mixture of benzene and other volatile solvents such as methanol, acetone, and methyl ethyl ketone. Paint removers formulated with these volatile solvents are extremely flammable and the flammability of these paint removers resulted in fires causing injury and deaths. The benzene based removers were rapidly replaced with the methylene chloride paint removers because methylene chloride paint removers can be formulated to be non-flammable and are effective in removing multiple layers of paint. The physical characteristics give the methylene chloride molecule the ability to quickly penetrate multiple layers and to soften or dissolve chemically resistant coatings. Methylene chloride does not deplete the ozone layer and is considered to make negligible contributions to smog formation, the green-house effect and acid rain. Like other organic solvents, methylene chloride can be harmful to human health if used improperly.

However, regulations are changing to remove methylene chloride and NMP from the environment. For example, on Mar. 15, 2019, the US Environmental Protection Agency (EPA) banned the consumer sale of methylene chloride in the United States.

Since ingredients to formulate an alternative to a methylene chloride paint stripper are typically extremely flammable and highly regulated as volatile organic compounds, the challenge to the industry is to create a paint stripping formulation which is high performing while meeting volatile organic compound (VOC) laws and having a reduced flammability risk. According to 40 CFR 51.100(s), a volatile organic compound (VOC) "means any compound of carbon, excluding carbon monoxide, carbon dioxide, carbonic acid, metallic carbides or carbonates, and ammonium carbonate, which participates in atmospheric photochemical reactions." The industry has typically used a high concentration of acetone in these alternative formulations because acetone is exempt from the VOC laws and is effective with paint removal. The problem with acetone is it has a flash point of negative 4-degree Fahrenheit which is considered extremely flammable.

Flammability risk is defined by the consumer product safety commission and, to date, most extremely effective alternative methylene chloride formulations have fallen into the "extremely flammable" classification which is defined as any substance that has a flashpoint at or below 20 degrees Fahrenheit. The two other classifications set by the CPSC are "flammable" (defined as having a flash point above 20 degree F. but below 100 degree F.) and "combustible" (defined as any substance with a flashpoint at or above 100 degree F.).

Thus, there is a need for a paint remover composition that has a lower flammability risk yet is effective at paint removal in a relatively short period of time.

SUMMARY OF THE INVENTION

The present invention relates to a composition having a paint removal or paint stripping effect and that meets VOC laws and reduces the flammability risk to a user. The terms "paint remover" and "patent stripper" are used interchangeably herein.

In an embodiment of the invention, the paint removal composition comprises dimethyl carbonate (DMC) and dimethyl sulfoxide (DMSO).

The composition comprising dimethyl carbonate (DMC) and dimethyl sulfoxide (DMSO) has a synergistic paint stripping effect.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DESCRIPTION OF THE PREFERRED EMBODIMENTS

The following description of the embodiments of the present invention is merely exemplary in nature and is in no way intended to limit the invention, its application, or uses. The present invention has broad potential application and utility, which is contemplated to be adaptable across a wide range of industries. The following description is provided herein solely by way of example for purposes of providing an enabling disclosure of the invention, but does not limit the scope or substance of the invention.

In an embodiment of the invention, a composition for paint removal or stripping comprises dimethyl carbonate (DMC) and dimethyl sulfoxide (DMSO).

In an embodiment of the invention, DMC is present in an amount of 80% or less by weight based on the total weight of the composition, preferably in an amount of 50% or less by weight based on the total weight of the composition.

In an embodiment of the invention, DMSO is present in an amount of 50% or less by weight based on the total weight of the composition, preferably in an amount of 30% or less by weight based on the total weight of the composition.

In addition to the DMC and DMSO, the composition may further comprise a solvent or a solvent blend. The solvent or solvent blend may contain an aliphatic solvent, aromatic solvent, aromatic alcohol, glycol ether, glycol ether ester or esters, ether, or a combination thereof. Non-limiting examples of solvents or solvent blends include, but are not limited to, an aliphatic solvent, mineral spirits, toluene, xylene or xylene containing mixture of isomers and ethyl benzene, Aromatic 100 (comprised of primarily $C_{9-10}$ dialkyl and trialkylbenzenes), Aromatic 200 (comprised of primarily $C_{11-16}$ aromatic hydrocarbons), alkyl benzene derivatives, benzyl alcohol, 2-butoxyethanol, diethylene glycol monobutyl ether acetate, propylene carbonate, tetrahydrofuran (THF), or a combination(s) thereof.

The composition may further comprise water.

The composition may further comprise an additive including, but not limited to, a surfactant (including, but not limited to, a fluorosurfactant), an ether containing compound such as diethyl glycol monobutyl ether, a dye, a fragrance, a thickener (including, but not limited to, starch, carboxy methyl cellulose), a corrosion inhibitor, a wax, other additive, or a combination thereof.

Non-limiting examples of a thickener include, but are not limited to, a hydroxypropyl methyl cellulose thickener such as Methocel 311 (The Dow Chemical Company) or Tylose PSO 81001 (ShinEtsu Se Tylose GmbH & Co. KG), a hydroxy propylcellulose thickener such as Klucel PR (Ashland).

Non-limiting examples of a wax include, but are not limited to, a paraffin wax with a melting point between 126° F. to 134° F. with an oil content less than 3.0% by weight.

Non-limiting examples of a surfactant include, but are not limited to, nonionic surfactants such as an ethoxylated alcohol with a HLB greater than 7.

The composition has a total volatile organic compound (VOC) (as defined in 40 CFR 51.100(s) by the Environmental Protection Agency (EPA)) content of 50 weight percent (%) or less, wherein the weight percent is based on the weight of the total composition.

The composition has a flash point at or above room temperature of 70° F.

In an embodiment of the invention, the composition can strip one or more layers of alkyd-based paint in a period of time of two hours or less.

The composition can be combined with a propellant and combined with other ingredients to be delivered in an aerosol format.

In an embodiment of the invention, the paint stripper formulation of the present invention is packaged in a metal can, particularly a steel tin plated can. Since a DMSO-containing paint stripping formulation is corrosive to metal packaging, the DMSO-containing formulation of the present invention may further comprise a corrosion inhibitor when packaged in a metal container so as to provide stability for the interior metal of the can and for the exterior metal of the can if the formulation was to accidentally drip, for example, onto the metal packaging during the manufacturing process.

In an embodiment of the invention, a corrosion inhibitor selected for internal protection of a metal container (such as a can) comprises an amine such as morpholine, triethanol amine, monoethanol amine, or a combination thereof.

In an embodiment of the invention, a corrosion inhibitor selected for internal protection of a metal container comprises a nitrate, phosphate, borate, or a combination thereof.

In an embodiment of the invention, a corrosion inhibitor selected for external protection of a metal container is a soap compound. Non-limiting examples of soap compounds include, but are not limited to, ammonium 9-octadecenoate, monoethanolamine 9-octadecenoate, diglycolamine 9-octadecenoate, morpholine 9-octadecenoate, and combinations thereof.

In an embodiment of the invention, a method of using the composition is provided. The method generally comprises providing a composition comprised of dimethyl carbonate (DMC), and dimethyl sulfoxide (DMSO) and having a flash point at or above 70 degrees Fahrenheit, and removing paint from a painted surface with the composition. The composition may be applied to the painted surface by any technique or device known to one of ordinary skill in the art such as by brush, roller, among others. Removal of one or more layers of paint may occur in a time period of two hours or less.

EXAMPLES

TABLE 1

| Synergistic Effect | | | |
| --- | --- | --- | --- |
| Solvents/Blends | Time to Remove 5 layers of Alkyd Paint | Flash Point (° F.) | Classification |
| 25% Aromatic 100*, 48% dimethyl carbonate (DMC), 25% dimethyl sulfoxide (DMSO), 2% minor components** | 39 minutes | 77 | Flammable |
| 25% xylene, 48% DMC, 25% DMSO, 2% minor components** | 40 minutes | 75 | Flammable |
| 49% DMC, 49% DMSO, 2% minor components** | 1 hour | 80 | Flammable |
| 24% Butyl Propionate, 25% Propylene Carbonate, 25% DMC, 24% dimethyl sulfoxide (DMSO), 2% minor components** | 1 hour 15 minutes | 97 | Flammable |
| 24% Butyl Propionate, 36% Propylene Carbonate, 12% DMC, 24% dimethyl sulfoxide (DMSO), 2% minor components** | 2 hours | 106 | Combustible |
| 11.5% Aromatic 100, 25% Aromatic 200, 25% Propylene Carbonate, 12.5% DMC, 24% dimethyl sulfoxide (DMS0), 2% minor components** | 2 hours | 110 | Combustible |
| 12% Xylene, 11% 2-Butoxyethanol, 25% Aromatic 200***, 10% Propylene Carbonate, 10% DMC, 24% dimethyl sulfoxide (DMSO), 2% minor components** | 2 hours | 102 | Combustible |

TABLE 1-continued

| | Synergistic Effect | | |
|---|---|---|---|
| Solvents/Blends | Time to Remove 5 layers of Alkyd Paint | Flash Point (° F.) | Classification |
| 24% Xylene, 15% Aromatic 200, 25% DB Acetate, 10% DMC, 24% dimethyl sulfoxide (DMSO), 2% minor components** | 1 hour 30 minutes | 102 | Combustible |

*Aromatic 100 is aromatic solvent having a flashpoint greater than about 100° F.. It is composed primarily of C$_{9-10}$ dialkyl and trialkylbenzenes.
**Minor components refer to a combination of surfactant, wax, and thickener.
***Aromatic 200 is an aromatic solvent having a flashpoint greater than about 200° F..

Example—Corrosion

The following is a table giving a non-exclusive list of examples of corrosion inhibitors that were tested and found to have been successful in maintaining the integrity of the interior and exterior of the metal package in which DMSO and DMC containing paint stripping formulations have been packaged.

TABLE 2

| Chemical Name | Trade Name | Range Percentage (weight percentages) | Corrosion Inhibition |
|---|---|---|---|
| Sodium Nitrate and Amine Based Proprietary Blend | Halox Flash-X 150 | 0.25-5.0 | Inside Can |
| Alkanolamine Borate and Phosphate Salts Proprietary Blend | Halox Flash-X 330 | 0.25-5.0 | Inside Can |
| Inorganic-organic hybrid corrosion inhibitor Proprietary Blend | Halox Flash-X 550 | 0.25-5.0 | Inside Can |
| Polymeric Phosphate Ester and Butyl Cellosolve Proprietary Blend | Lubrizol 2063 | 1.0-5.0 | Inside Can |
| Monoethanol amine | MEA | 0.25-5.0 | Inside Can |
| Triethanolamine | TEA | 0.25-5.0 | Inside Can |
| Tetrahydro-2H-1,4-oxazine; 1-Oxa-4-azacyclohexane | Morpholine | 0.1-5.0 | Inside Can |
| Ammonium 9-octadecenoate | Ammonium Oleate Soap | 0.25-5.0 | Outside Can |
| Monoethanolamine 9-octadecenoate | Monoethanolamine Oleate Soap | 0.25-5.0 | Outside Can |
| Diglycolamine 9-octadecenoate | Diglycolamine Oleate Soap | 0.25-5.0 | Outside Can |
| Morpholine 9-octadecenoate | Morpholine Oleate Soap | 0.25-5.0 | Outside Can |

Comparative Examples

The following results are shown in Table 3 for comparative purposes to the results of Table 1.

TABLE 3

| Solvents/Blends | Time to Remove 5 layers of Alkyd Paint | Flash Point (° F.) | Classification |
|---|---|---|---|
| 25% toluene, 48% acetone, 25% DMSO, and 2% minor components | 30 minutes | 0 | Extremely Flammable |
| 100% toluene | Over 2 hours | 43 | Flammable |
| 100% DMSO | Over 2 hours | 192 | None |
| 100% acetone | Over 2 hours | -4 | Extremely Flammable |
| 100% dimethyl carbonate (DMC) | Over 2 hours | 63 | Flammable |
| 100% Aromatic 100 | Over 2 hours | 106 | Combustible |
| 100% xylene | Over 2 hours | 84 | Flammable |
| 100% benzyl alcohol | Over 2 hours | 194 | None |

The following observations were made based on the examples. Dimethyl carbonate has a lower flash point at 63-degree Fahrenheit than does the synergistic composition of the present invention comprising both DMC and DMSO.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A paint remover composition comprising:
10 weight percent to 49 weight percent dimethyl carbonate (DMC),
dimethyl sulfoxide (DMSO) is present in the paint remover composition, and is included at a concentration of 24 weight percent or less in the paint remover composition,
12 weight percent to 25 weight percent xylene or xylene containing mixture of isomers and ethyl benzene, and
0.25 weight percent to 5 weight percent of a corrosion inhibitor comprising oleic acid, morpholine, or a combination thereof,
wherein the composition removes paint and has a flash point between 70 degrees Fahrenheit and 110 degrees Fahrenheit, and
wherein the ratio of DMC to xylene is from 1:2.5 to 4:1.

2. The paint remover composition according to claim 1, wherein the corrosion inhibitor provides corrosion resistance to an internal surface of a metal container containing the composition.

3. The paint remover composition according to claim 1, wherein the corrosion inhibitor provides corrosion resistance to an external surface of a metal container containing the paint remover composition.

4. The paint remover composition according to claim 1, wherein the corrosion inhibitor further comprises triethanol amine, monoethanol amine, and a combination thereof.

5. The paint remover composition according to claim 1, wherein the corrosion inhibitor further comprises a nitrate, phosphate, borate, or a combination thereof.

6. The paint remover composition according to claim 1, wherein the corrosion inhibitor is a soap compound.

7. The paint remover composition according to claim 6, wherein the soap compound is selected from the group consisting of ammonium 9-octadecenoate, monoethanolamine 9-octadecenoate, diglycolamine 9-octadecenoate, morpholine 9-octadecenoate, and a combination thereof.

8. A method of using a composition for paint removal, the method comprising:

providing paint remover composition of claim 1, and
   removing paint from a painted surface with the composition.

9. The method according to claim 8, wherein removal of paint occurs in a time period of two hours or less.

10. The method of using according to claim 8, wherein the paint remover composition further comprises another solvent or solvent blend.

11. The method of using according to claim 10, wherein the solvent or solvent blend is selected from the group consisting of an aliphatic solvent, aromatic solvent, aromatic alcohol, glycol ether, glycol ether ester or esters, ether, and a combination thereof.

12. The method of using according to claim 10, wherein the solvent or solvent blend is selected from the group consisting of an aliphatic solvent, mineral spirits, toluene, xylene or xylene containing mixture of isomers and ethyl benzene, aromatic solvent, alkyl benzene derivatives, benzyl alcohol, 2-butoxyethanol, diethylene glycol monobutyl ether acetate, propylene carbonate, tetrahydrofuran (THF), and a combination(s) thereof.

13. The method of using according to claim 8, wherein the paint remover composition further comprises water.

14. The method of using according to claim 8, wherein the paint remover composition further comprises an additive selected from the group consisting of a surfactant, an ether containing compound, a dye, a thickener, a fragrance, a wax, and a combination thereof.

15. The method of using according to claim 8, wherein the paint remover composition has a total VOC content of 50 weight percent (%) or less based on the weight of the total composition.

* * * * *